(12) United States Patent
Hosotani

(10) Patent No.: US 7,778,048 B2
(45) Date of Patent: Aug. 17, 2010

(54) SWITCHING POWER SUPPLY APPARATUS

(75) Inventor: Tatsuya Hosotani, Muko (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 420 days.

(21) Appl. No.: 11/856,281

(22) Filed: Sep. 17, 2007

(65) Prior Publication Data

US 2008/0291702 A1    Nov. 27, 2008

(30) Foreign Application Priority Data

May 21, 2007   (JP)   ............................. 2007-134654

(51) Int. Cl.
    *H02M 3/335*   (2006.01)
(52) U.S. Cl. ................. 363/21.02; 363/56.01
(58) Field of Classification Search .................. 363/20, 363/21.01, 21.02, 21.03, 56.01, 95, 97
    See application file for complete search history.

(56) References Cited

U.S. PATENT DOCUMENTS

| | | | |
|---|---|---|---|
| 6,201,713 B1 | 3/2001 | Hosotani | |
| 6,469,913 B2 * | 10/2002 | Hosotani et al. | ............... 363/16 |
| 6,788,556 B2 * | 9/2004 | Hosotani et al. | ......... 363/21.15 |
| 2002/0080634 A1 | 6/2002 | Nozawa et al. | |
| 2002/0101742 A1 | 8/2002 | Hosotani et al. | |
| 2004/0130914 A1 | 7/2004 | Abe | |

FOREIGN PATENT DOCUMENTS

| | | |
|---|---|---|
| JP | 08-317647 A | 11/1996 |
| JP | 2001-037220 A | 2/2001 |
| JP | 2002-112544 A | 4/2002 |
| JP | 2002-209381 A | 7/2002 |
| JP | 2004-153948 A | 5/2004 |

* cited by examiner

*Primary Examiner*—Adolf Berhane
(74) *Attorney, Agent, or Firm*—Keating & Bennett, LLP

(57) ABSTRACT

In a switching power supply apparatus, an inductor, a transformer, a first switching circuit, a second switching circuit, and a capacitor are connected to each other so that a first switching element and a second switching element can be alternately turned on and off, an output can be obtained from a secondary winding of the transformer, and an output voltage can be controlled by controlling the ON period of the first switching element. The secondary winding of the transformer is connected to a first rectifying and smoothing circuit. A first control circuit is configured to operate using a DC voltage supplied from a second rectifying and smoothing circuit. After the second switching element has been turned on, the second switching element is forcefully turned off at a predetermined time set by a turn-off circuit included in a second control circuit that operates using an AC voltage.

24 Claims, 12 Drawing Sheets

SWITCHING POWER SUPPLY APPARATUS

BACKGROUND OF THE INVENTION

1. Field of the Invention

The present invention relates to a resonant-type switching power supply apparatus including a first switching element and a second switching element which are located on the primary side of a transformer and are alternately turned on and off.

2. Description of the Related Art

Currently, resonant-type switching power supply apparatuses are used to achieve high circuit efficiency (see, for example, Japanese Unexamined Patent Application Publication Nos. 2002-112544 and 2002-209381). FIG. 1 is a circuit diagram of a switching power supply apparatus disclosed in Japanese Unexamined Patent Application Publication No. 2002-112544.

In a switching power supply apparatus illustrated in FIG. 1, a primary winding T1 of a transformer T, an inductor Lr, and a capacitor Cr are connected in series and form a series circuit. One end of this series circuit is connected to a node between a first switching circuit S1 including a first switching element Q1 and a second switching circuit S2 including a second switching element Q2, and the other end thereof is connected to a power input portion.

A first driving winding T3 of the transformer T generates a voltage substantially proportional to a voltage generated by the primary winding T1. The generated voltage is input into a first control circuit 11. The first control circuit 11 includes: a delay circuit that is a series circuit including a resistor R3 and a capacitor C3 and connected between the first driving winding T3 and a gate of the first switching element Q1; a transistor Tr1 that is a switching portion for turning off the first switching element Q1; and a time constant circuit that includes a capacitor C4 and a photocoupler PC for receiving a feedback signal from a detection circuit 14 and is connected to a base of the transistor Tr1. The control circuit 11 turns on the first switching element Q1 with a delay after the first driving winding T3 has generated a voltage. Furthermore, the control circuit 11 turns off the first switching element Q1 quickly by turning on the transistor Tr1 after a time set by the time constant circuit, which has the impedance of the photocoupler PC and the capacitor C4, has elapsed since the primary winding T3 generated a voltage.

The transformer T includes a second driving winding T4. A voltage generated by the second driving winding T4 is applied to a second control circuit 12. The second control circuit 12 includes: a delay circuit that is a series circuit including a resistor R5 and a capacitor C5 and connected in series to the second driving winding T4; a transistor Tr2 that is a switching portion for turning off the second switching element Q2; and a time constant circuit that includes a resistor R6 and a capacitor C6 and is connected to a base of the transistor Tr2.

On the side of a secondary winding T2 of the transformer T, a rectifier diode Ds, a smoothing capacitor Co, and an output voltage detection circuit 14 are disposed.

Thus, the first switching element Q1 is turned on using an AC voltage generated by the driving winding T3, and the second switching element Q2 is turned on using an AC voltage generated by the driving winding T4. Furthermore, the first switching element Q1 and the second switching element Q2 are turned off by the first control circuit 11 and the second control circuit 12, respectively, each of which operates using an AC voltage.

FIG. 2 is a circuit diagram of a switching power supply apparatus disclosed in Japanese Unexamined Patent Application Publication No. 2002-209381. As illustrated in FIG. 2, a DC power supply 30 is connected in parallel to a series circuit including an FET 21 and an FET 22. A series circuit including a capacitor 23 and a primary winding 25 of a transformer 24 is connected in parallel to the FET 22. On the secondary side of the transformer 24, two windings (a winding 28 and a winding 29) and a rectifying and smoothing circuit including a diode 32, a diode 33, and a capacitor 34 are disposed. In order to maintain a smoothed DC output voltage constant, an output voltage detection circuit 37 performs feedback control. A tertiary winding 26 of the transformer 24 is connected to a gate of the FET 22 via a resistor 36. A diode 31 and a capacitor 35 perform half-wave rectification upon a voltage generated by a quaternary winding 27 of the transformer 24. A voltage acquired by the half-wave rectification is used as a power supply voltage for a control circuit 38. The quaternary winding 27 of the transformer 24 is connected to the control circuit 38 so as to detect the switching of the power supply voltage.

Thus, the FET 21 (a first switching element) is driven and controlled by a logic circuit that operates using a DC voltage, and the FET 22 (a second switching element) is turned on and off using an AC voltage generated by the tertiary winding 26 (driving winding).

However, in the switching power supply apparatus disclosed in Japanese Unexamined Patent Application Publication No. 2002-112544, the first switching element Q1 is driven, using a voltage generated by the driving winding T3 for generating a voltage substantially proportional to a voltage generated by the primary winding, by a circuit that operates using an AC voltage generated by the driving winding T3. Accordingly, a logic circuit that operates using a DC voltage cannot be used. It is necessary to use a circuit that operates using an AC voltage for each of an overcurrent protection operation, an overvoltage protection operation, a startup operation, and a stop operation. This leads to a complicated circuit configuration and makes the miniaturization of a switching power supply apparatus difficult.

Furthermore, it is difficult to integrate circuits, each of which operates using an AC voltage. This makes the miniaturization of a control circuit difficult.

In the switching power supply apparatus disclosed in Japanese Unexamined Patent Application Publication No. 2002-209381, the FET 22 is driven and turned on and off using a voltage generated by the tertiary winding 26. Accordingly, an ON period of the FET 22 cannot be set, and a switching frequency cannot be adjusted. Such a switching power supply apparatus cannot therefore efficiently operate in response to changes in input voltage or load. Furthermore, there are the following disadvantages in such a switching power supply apparatus. The configurations of circuits used for an overcurrent protection operation, an overvoltage protection operation, a startup operation, and a stop operation become complicated. When circuits operate, a power loss is increased due to temperature characteristics of circuit components and variations in characteristics of the circuit components. Such a switching power supply apparatus becomes larger in size.

SUMMARY OF THE INVENTION

In order to overcome the problems described above, preferred embodiments of the present invention provide a compact switching power supply apparatus that has a simple circuit configuration and can efficiently operate even if an input voltage or a load changes.

A switching power supply apparatus according to a preferred embodiment of the present invention includes: a first switching circuit including a parallel connection circuit that includes a first switching element, a first diode, and a first capacitor; a second switching circuit including a parallel connection circuit that includes a second switching element, a second diode, and a second capacitor; a first control circuit configured to operate using a direct current and control ON and OFF of the first switching element; a second control circuit configured to control ON and OFF of the second switching element, the second control circuit including a turn-off circuit; and a transformer including a primary winding, a secondary winding, a first driving winding, and a second driving winding, the secondary winding being connected to a first rectifying and smoothing circuit, the first and second driving windings each generating a voltage substantially proportional to a voltage of the primary winding, the first driving winding being connected to the first control circuit via a second rectifying and smoothing circuit, the second driving winding being connected to the second control circuit. A power input portion, an inductor, the primary winding of the transformer, at least one capacitor, and the first switching circuit define a series circuit, and a series circuit including the inductor, the primary winding of the transformer, and the at least one capacitor is connected in parallel to the second switching circuit. Alternatively, the power input portion, the inductor, the primary winding of the transformer, and the first switching circuit define a series circuit, and a series circuit including the inductor and the primary winding of the transformer is connected in parallel to a series circuit including the second switching circuit and at least one capacitor. Alternatively, the power input portion, the inductor, the primary winding of the transformer, and the first switching circuit define a series circuit, and a series circuit including the second switching circuit and at least one capacitor is connected in parallel to the first switching circuit. An output voltage is controlled by controlling an ON period of the first switching element. The second switching element is forcefully turned off after a predetermined time set by the turn-off circuit has elapsed since the second control circuit, operated using an alternating voltage generated by the second driving winding, turned the second switching element on.

A switching power supply apparatus according to a preferred embodiment of the present invention includes: a first switching circuit including a parallel connection circuit that includes a first switching element, a first diode, and a first capacitor; a second switching circuit including a parallel connection circuit that includes a second switching element, a second diode, and a second capacitor; a first control circuit configured to operate using a direct current and control ON and OFF of the first switching element; a second control circuit configured to control ON and OFF of the second switching element, the second control circuit including a turn-off circuit; and a transformer including a primary winding, a secondary winding, a first driving winding, and a second driving winding, the secondary winding being connected to a first rectifying and smoothing circuit, the first and second driving windings each generating a voltage substantially proportional to a voltage of the primary winding, the first driving winding being connected to the first control circuit via a second rectifying and smoothing circuit, one end of the second driving winding being connected to one end of the second switching circuit, the other end of the second driving winding being connected to the second control circuit. A power input portion, an inductor, the primary winding of the transformer, at least one capacitor, and the second switching circuit define a series circuit, and a series circuit including the inductor, the primary winding of the transformer, and the at least one capacitor is connected in parallel to the first switching circuit. Alternatively, the power input portion, the inductor, the primary winding of the transformer, and the second switching circuit define a series circuit, and a series circuit including the inductor and the primary winding of the transformer is connected in parallel to a series circuit including the first switching circuit and at least one capacitor. Alternatively, the power input portion, the inductor, the primary winding of the transformer, and the second switching circuit define a series circuit, and a series circuit including the first switching circuit and at least one capacitor is connected in parallel to the second switching circuit. An output voltage is controlled by controlling an ON period of the second switching element. The second switching element is forcefully turned off after a predetermined time set by the turn-off circuit has elapsed since the second control circuit, operated using an alternating voltage generated by the second driving winding, turned the second switching element on.

According to each of the above-described switching power supply apparatuses, the following advantages (a) to (e) can be obtained.

A switching power supply apparatus according to a preferred embodiment of the present invention detects a time at which the polarity of an AC voltage generated by the first driving winding has been changed, and turns on the first switching element at a time based on the detection result. Accordingly, a time at which the first switching element is turned on can be set arbitrarily, and zero voltage switching of the first switching element can be performed. This leads to the reduction of a switching loss.

A switching power supply apparatus according to a preferred embodiment of the present invention can maintain a driving voltage used to drive the first switching element constant regardless of changes in amplitude of an AC voltage generated by the first driving winding. Accordingly, an appropriate driving voltage can be applied to the first switching element as a gate voltage, and a driving loss can therefore be reduced.

A switching power supply apparatus according to a preferred embodiment of the present invention detects a current passing through the first switching element, and turns off the first switching element on the basis of the detection result. Accordingly, a current passing through the first switching element can be prevented from becoming excessive.

A switching power supply apparatus according to a preferred embodiment of the present invention preferably directly drives and controls the second switching element using an AC voltage generated by the second driving winding. Accordingly, a high-voltage IC and a pulse transformer are not required. On the other hand, a low-voltage IC can be used as a circuit used to drive and control the first switching element. Consequently, the miniaturization of the switching power supply apparatus and cost reduction can be achieved.

A switching power supply apparatus according to a preferred embodiment of the present invention is provided with the turn-off circuit, and turns off the second switching element using the turn-off circuit. Accordingly, the ON period of the second switching element can be determined arbitrarily, and a high-efficiency operation can always be achieved even if a load or an input voltage changes.

(3) The first control circuit preferably is a semiconductor integrated circuit including a logic circuit for controlling a time at which the first switching element is turned on and a time at which the first switching element is turned off using a direct voltage.

Accordingly, the miniaturization of the control circuit can be achieved, and the miniaturization of the switching power supply apparatus can therefore be achieved. A voltage used to drive the first switching element is maintained constant regardless of changes in amplitude of an AC voltage generated by the first driving winding. Accordingly, an appropriate driving voltage can be applied to the first switching element as a gate voltage, and a driving loss can therefore be reduced.

(4) The first control circuit includes a polarity reversal detection circuit for detecting whether a polarity of a voltage generated by the first driving winding has been reversed. A time at which the first switching element is turned on is determined on the basis of an output of the polarity reversal detection circuit.

Accordingly, when a value of a voltage across the first switching element decreases to zero or nearly zero, the first switching element can be turned on. Thus, zero voltage switching of the first switching element can be performed. Consequently, a switching loss of the first switching element can be significantly reduced. This leads to the achievement of a high-efficiency and low-loss switching power supply apparatus.

(5) The first control circuit includes a current detection circuit for detecting a current passing through the first switching element as a voltage using a current detection resistor connected in series to the first switching element, and an output voltage detection circuit for detecting an output voltage output on a secondary side of the transformer. The first control circuit controls a time at which the first switching element is turned off on the basis of outputs of the current detection circuit and the output voltage detection circuit.

Accordingly, the value of the output voltage can be set to a desirable value by controlling the ON period of the first switching element. Furthermore, a switching power supply apparatus according to a preferred embodiment of the present invention is superior to a switching power supply apparatus for controlling the ON period of the first switching element using only a signal based on an output voltage in view of the output voltage stability and the output voltage response characteristic to a load change.

(6) The first control circuit includes an overcurrent protection portion configured to perform control processing for turning off the first switching element so as to cause the first switching element to continue an oscillation operation when a value of an output obtained from the current detection circuit reaches a predetermined value, and force the first switching element to stop an oscillation operation when a state in which a value of an output obtained from the output voltage detection circuit is below a predetermined value lasts for a predetermined time.

Accordingly, when abnormal conditions in which an output current becomes excessive are encountered, the switching operation is stopped, or is temporarily stopped. Thus, an oscillation period and a non-oscillation period are alternately repeated. By setting the non-oscillation period, the heat generation of the first and second switching elements can be reduced. This leads to the enhancement of reliability of the switching power supply apparatus.

(7) The first control circuit includes an overvoltage protection portion configured to force the first switching element to stop an oscillation operation when a value of an output obtained from the output voltage detection circuit exceeds a predetermined value.

Accordingly, when abnormal conditions in which an output voltage becomes excessive are encountered, the switching operation can be stopped. This leads to the enhancement of reliability of the switching power supply apparatus.

(8) The switching power supply apparatus further includes an input voltage detection circuit configured to detect a voltage of the power input portion. The first control circuit includes a low voltage input protection portion configured to force the first switching element to stop an oscillation operation when a detection value obtained by the input voltage detection circuit is below a predetermined value.

Accordingly, currents passing through the transformer, the first switching element, and the second switching element are prevented from becoming excessive at a low voltage of the power input portion. Consequently, the increase in loss can be prevented, and the reliability of the switching power supply apparatus can therefore be enhanced.

(9) The first control circuit includes a frequency control portion configured to control an upper limit of a frequency used to control ON and OFF of the first switching element.

Accordingly, when output power is low under light-load conditions, the increase in switching frequency can be controlled. This can prevent a phenomenon in which the switching losses of the first switching element and the second switching element increase in accordance with the increase in switching frequency, and the first switching element and the second switching element generate heat. Consequently, the reliability of the switching power supply apparatus can be enhanced.

(10) The first control circuit includes a frequency reducing portion configured to reduce a value of a frequency used to control ON and OFF of the first switching element when the frequency reducing portion detects, using a feedback signal transmitted from the output voltage detection circuit, that a load connected to the first rectifying and smoothing circuit is under lighter-load conditions as compared with predetermined load conditions.

Thus, the value of a switching frequency can be forcefully reduced in accordance with the decrease in output power under light-load conditions. Accordingly, the switching losses of the first switching element and the second switching element can be reduced. This leads to the achievement of a high-efficiency switching power supply apparatus.

(11) An inductance of the inductor corresponds to a leakage inductance of the transformer.

Accordingly, it is not required to provide an external inductor as the inductor. Consequently, the number of components can be reduced. Furthermore, an energy loss due to the leakage inductance of the transformer can be reduced.

(12) The first switching circuit or the second switching circuit preferably is a field effect transistor.

Accordingly, the parasitic diode and parasitic capacitor of the first or second switching element included in the first or second switching circuit can be used. Accordingly, it is not required to newly provide a diode and a capacitor.

(13) The turn-off circuit preferably includes a CR circuit including a capacitor and a resistor. A time at which the second switching element is turned off is set on the basis of a CR time constant that is determined on the basis of a product of a value of the capacitor and a value of the resistor.

Accordingly, the turn-off circuit can be achieved with a small number of components. By setting a value of a CR time constant so that the second switching element is turned off when a voltage across the capacitor or the resistor reaches a threshold voltage, the second switching element can be turned off at any given time.

According to various preferred embodiments of the present invention, the following advantages can be obtained. (1) Zero voltage switching can be performed even if a load or an input voltage changes. Consequently, circuit efficiency can be enhanced. (2) A semiconductor integrated circuit having a low breakdown voltage can be used as a switching control circuit. (3) The first switching element can be turned on at an appropriate time on the basis of the drain current of the first switching element, the output voltage on the secondary side, and the detection result of the occurrence of the polarity reversal of a voltage generated by the first driving winding. Consequently, zero voltage switching can be accurately performed. This leads to the enhancement of circuit efficiency.

(4) A voltage to be applied to the gate of the first switching element can be maintained constant regardless of changes in voltage generated by a driving winding. Accordingly, an appropriate driving voltage can be applied as a gate voltage. Consequently, a driving loss can be reduced. Thus, the above-described advantages can be obtained. Consequently, there can be provided a compact switching power supply apparatus that has a simple circuit configuration and can efficiently operate even if an input voltage or a load changes.

Other features, elements, characteristics and advantages of the present invention will become more apparent from the following detailed description of preferred embodiments of the present invention with reference to the attached drawings.

DETAILED DESCRIPTION OF PREFERRED EMBODIMENTS

First Preferred Embodiment

Figure 1:
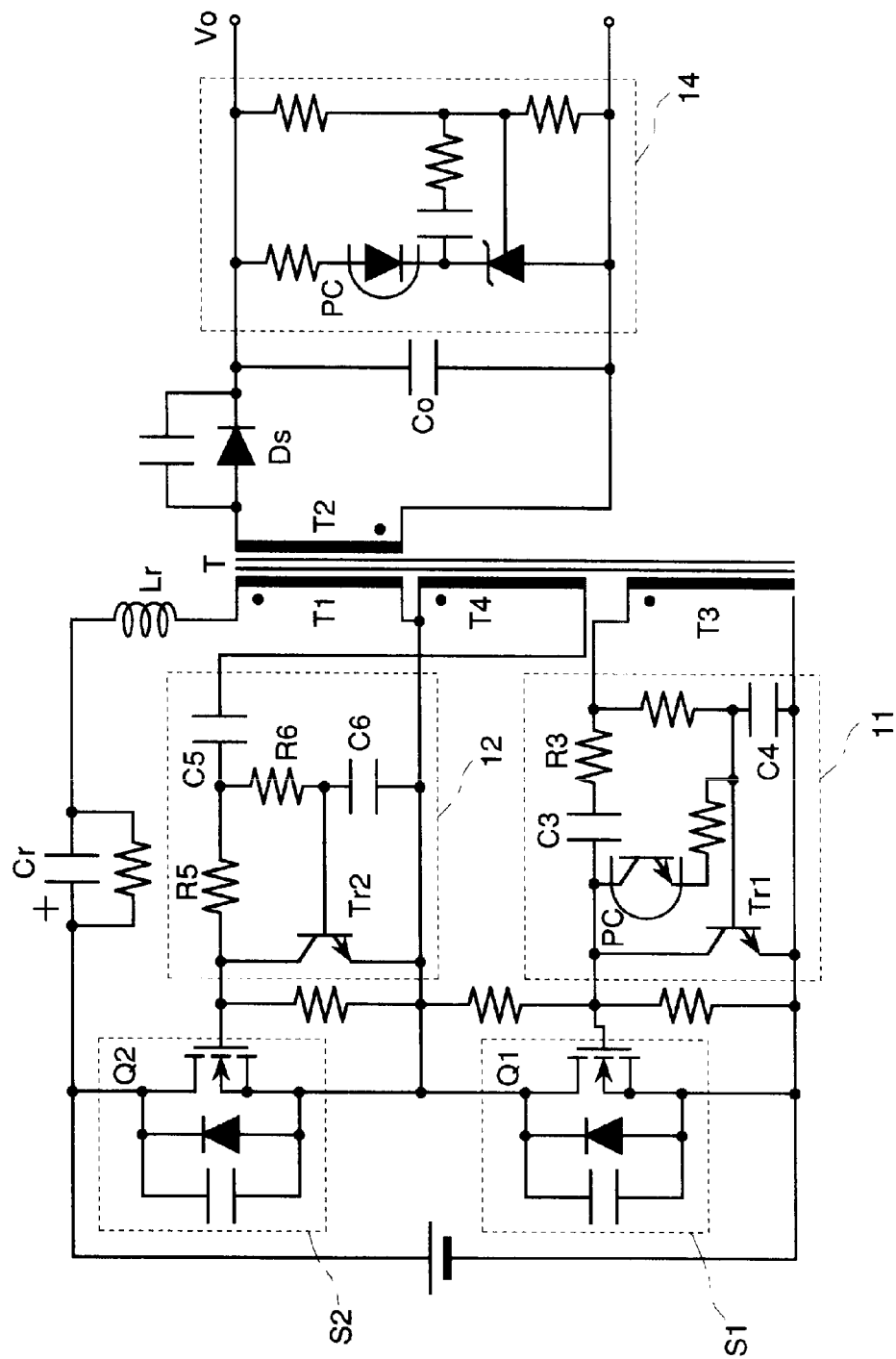
FIG. 1 is a circuit diagram of a known switching power supply apparatus.
Figure 2:
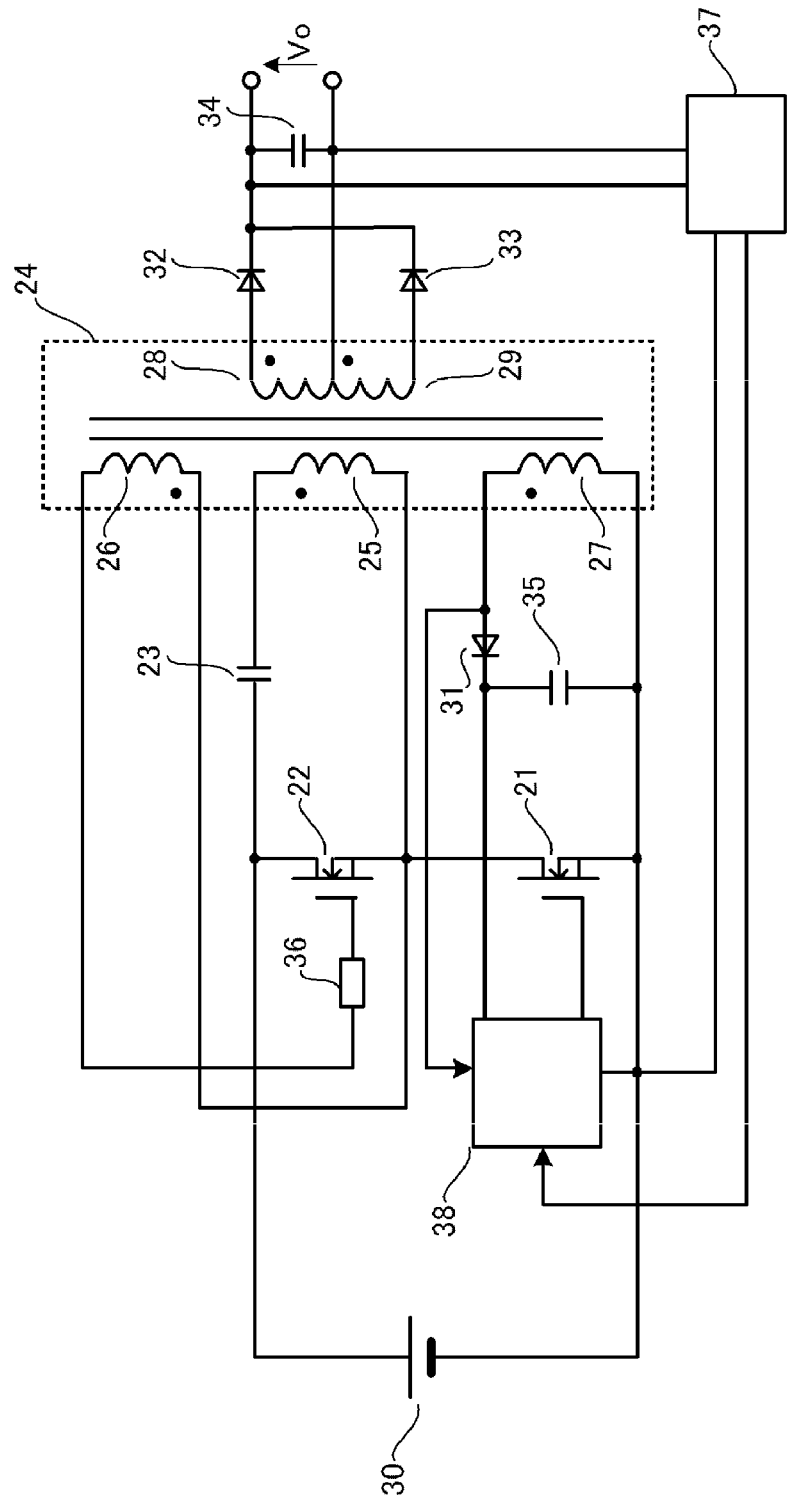
FIG. 2 is a circuit diagram of another known switching power supply apparatus.
Figure 3:
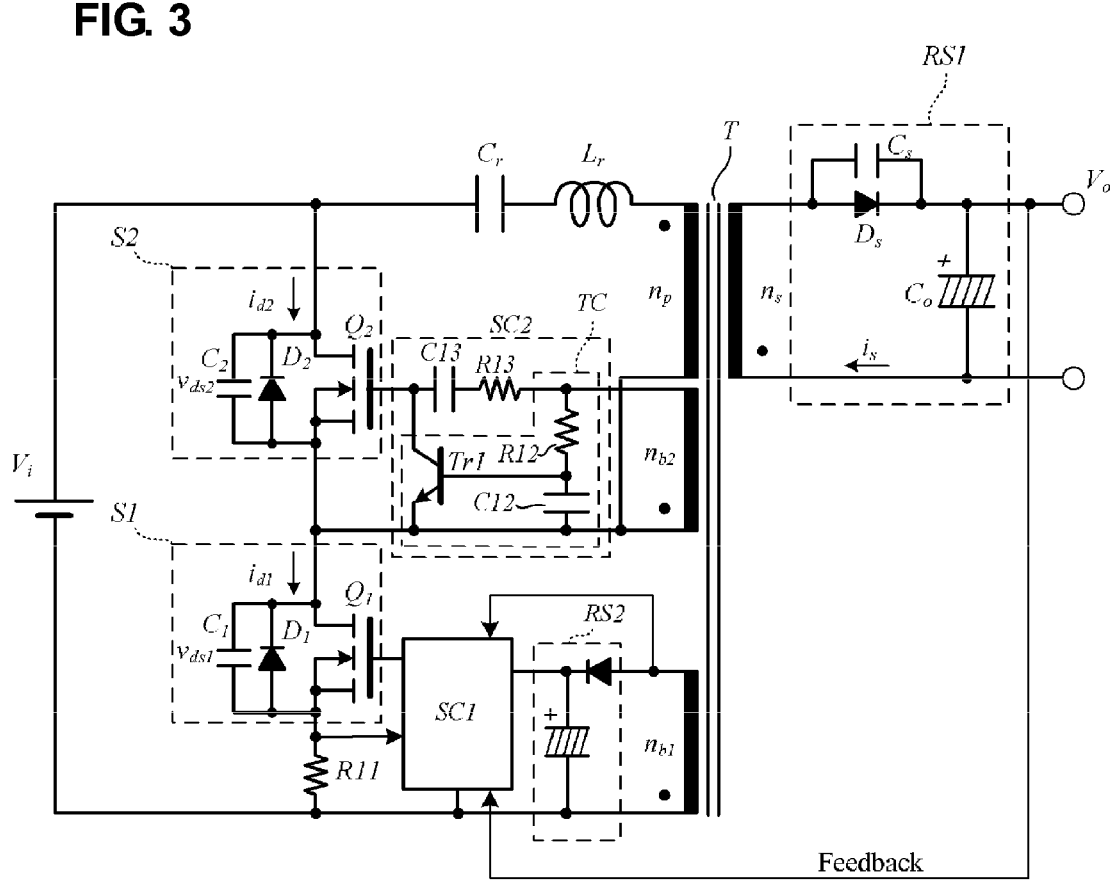
FIG. 3 is a circuit diagram of a switching power supply apparatus according to a first preferred embodiment of the present invention.

FIG. 3 is a circuit diagram of a switching power supply apparatus according to a first preferred embodiment of the present invention. As illustrated in FIG. 3, this switching power supply apparatus preferably includes a series circuit including a power input portion, an inductor Lr, a primary winding np of a transformer T, at least one capacitor Cr, and a first switching circuit S1. A series circuit including the inductor Lr, the primary winding np of the transformer T, and the capacitor Cr is connected in parallel to a second switching circuit S2.

The first switching circuit S1 includes a parallel connection circuit including a first switching element Q1, a first diode D1, and a first capacitor C1. The second switching circuit S2 includes a parallel connection circuit including a second switching element Q2, a second diode D2, and a second capacitor C2.

When the first and second switching elements are field effect transistors such as MOSFETs, the parasitic diodes of the first and second switching elements can be used as the first diode D1 and the second diode D2, respectively, and the parasitic capacitors of the first and second switching elements can be used as the first capacitor C1 and the second capacitor C2, respectively. Accordingly, it is not required to newly provide components as the first diode D1, the second diode D2, the first capacitor C1, and the second capacitor C2. Thus, the number of components can be reduced.

The transformer T includes a first driving winding nb1 and a second driving winding nb2 each of which generates a voltage substantially proportional to a voltage of the primary winding np. One end of the first driving winding nb1 is connected to one end of the power input portion (the negative terminal of an input voltage Vi). The other end of the first driving winding nb1 is connected via a second rectifying and smoothing circuit RS2 to a first control circuit SC1 for controlling a control voltage (gate input voltage) for the first switching element Q1. Consequently, the first control circuit SC1 is driven using a DC voltage supplied from the second rectifying and smoothing circuit RS2.

One end of the second driving winding nb2 is connected to a node between the first switching circuit S1 and the second switching circuit S2. The other end of the second driving winding nb2 is connected to a second control circuit SC2 for controlling a control voltage (gate input voltage) for the second switching element Q2.

In the second control circuit SC2, a series circuit including a resistor R13 and a capacitor C13 is connected between the other end of the second driving winding nb2 and the gate of the second switching element Q2. Consequently, the second switching element Q2 is turned on using a voltage generated by the second driving winding nb2. Furthermore, the second control circuit SC2 includes a turn-off circuit TC including a resistor R12, a capacitor C12, and a transistor Tr1. After a predetermined time set by the turn-off circuit TC has elapsed since the second switching element Q2 was turned on, the second switching element Q2 is forcefully turned off.

With the above-described configuration, the switching power supply apparatus stores energy in the primary winding np of the transformer T and the capacitor Cr during an ON period of the first switching element Q1, and acquires an output from a secondary winding ns of the transformer T during an OFF period of the first switching element Q1, thereby functioning as a flyback converter for controlling an output voltage Vo by controlling the ON period of the first switching element Q1.

Here, the inductance of the inductor Lr corresponds to a leakage inductance of the transformer T. Accordingly, it is not required to provide an external inductor as the inductor Lr. Consequently, an energy loss due to the leakage inductance of the transformer T can be reduced.

The configuration and operation characteristics of a switching power supply apparatus according to the first preferred embodiment of the present invention are as follows.

The first switching element Q1 is driven by the first control circuit SC1. The first control circuit SC1 is a logic circuit (IC) that operates using a DC voltage. More specifically, the first control circuit SC1 detects a time at which the polarity of an AC voltage generated by the first driving winding nb1 has been reversed, and turns on the first switching element Q1 at a time based on the detection result.

The first control circuit SC1 detects a current passing through the first switching element Q1, and turns off the first switching element Q1 on the basis of the detection result.

The second control circuit SC2 turns on the second switching element Q2 using an AC voltage generated by the second driving winding nb2.

The second control circuit SC2 operates using an AC voltage generated by the second driving winding nb2, and turns off the second switching element Q2.

The first control circuit SC1 compares a signal based on a current passing through the first switching element Q1 with a signal based on the output voltage Vo, and determines when it should turn off the first switching element Q1, thereby controlling the output voltage Vo.

Figure 4:
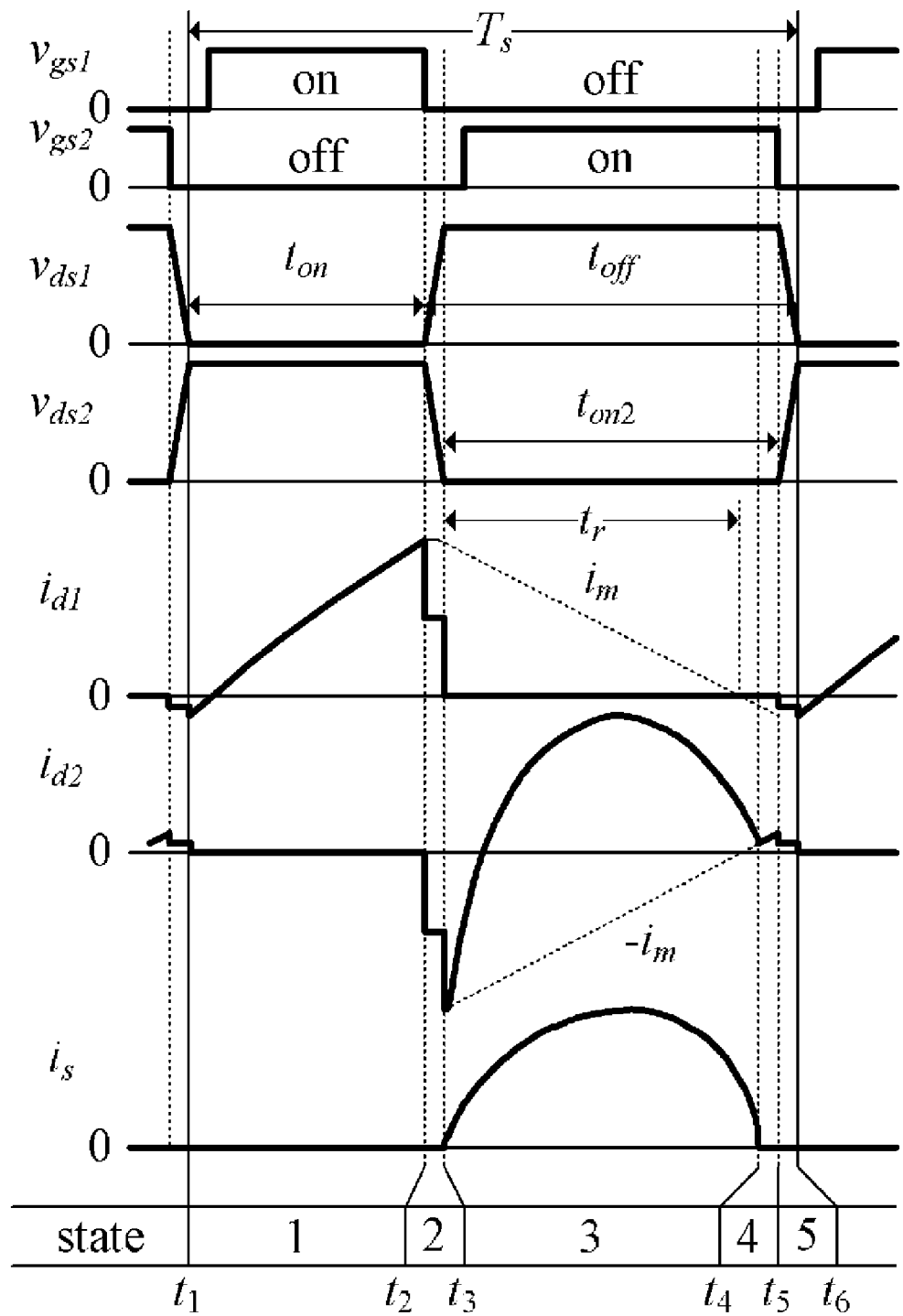
FIG. 4 is a diagram illustrating a waveform of each circuit included in a switching power supply apparatus according to the first preferred embodiment of the present invention.

FIG. 4 is a diagram illustrating waveforms of circuits included in the switching power supply apparatus illustrated in FIG. 3. In the following, the operation of each circuit will be described with reference to FIGS. 3 and 4. Referring to FIG. 4, a waveform "vgs1" denotes the ON and OFF of the first switching element Q1, a waveform "vgs2" denotes the ON and OFF of the second switching element Q2, a waveform "vds1" denotes a waveform of a voltage across the first capacitor C1, a waveform "vds2" denotes a waveform of a voltage across the second capacitor C2, and waveforms "id1", "id2", and "is" denote waveforms of currents of the first switching circuit S1, the second switching circuit S2, and the secondary winding ns, respectively.

The operation of this switching power supply apparatus under rated operating conditions can be divided into five operation states in a single switching period Ts from a time t1 to a time t6. In the following, circuit operations performed in the five operation states will be individually described.

State 1 [t1 to t2]

If the first control circuit SC1 detects that the polarity of an AC voltage generated by the first driving winding nb1 has been reversed when the first diode D1 is conducting, it performs zero voltage switching upon the first switching element Q1 by turning on the first switching element Q1 while the first diode D1 is conducting.

A voltage obtained by subtracting a voltage of the capacitor Cr from an input voltage Vi is applied to the primary winding np. Then, an exciting current im increases substantially linearly, and excitation energy is stored in the transformer T. At the same time, the capacitor Cr is charged, whereby electrostatic energy is stored in the capacitor Cr.

The first control circuit SC1 compares a voltage across a current detection resistor R11 (a signal voltage based on a detected current passing through the first switching element Q1) with a signal voltage based on the output voltage Vo, determines a time at which the first switching element Q1 is turned off on the basis of the comparison result so that the output voltage Vo can be maintained constant, and turns off the first switching element Q1 at a time t2. Consequently, the polarity of the voltage of the transformer T is reversed.

State 2 [t2 to t3]

The first capacitor C1 is charged with a current passing through the primary winding np, the second capacitor C2 and a capacitor Cs on the secondary side are discharged. When a voltage shown in the waveform "vds2" reaches zero at a time t3, the second diode D2 and a diode Ds on the secondary side are brought into conduction.

State 3 [t3 to t4]

While the second diode D2 is conducting, zero voltage switching is performed upon the second switching element Q2 by turning on the second switching element Q2 using a voltage generated by the second driving winding nb2. The inductor Lr (leakage inductance) and the capacitor Cr resonate with each other, whereby the excitation energy stored in the transformer T during the ON period of the first switching element Q1 and the electrostatic energy stored in the capacitor Cr during the ON period of the first switching element Q1 are released from the secondary winding ns. The waveform "is" becomes similar to a waveform of a current having a value obtained by subtracting a value of a resonance current indicated by the waveform "id2" from a value of a linearly decreasing exciting current im. When the exciting current im becomes equal to the above-described resonance current at a time t4, the value of a current indicated by the waveform "is" becomes zero. Here, the resonance performed by the capacitor Cr and the inductor Lr is stopped.

State 4 [t4 to t5]

The exciting current im linearly decreases to a negative value in accordance with a change in voltage vc across the capacitor Cr. At a time t5, the second switching element Q2 is turned off, whereby the polarity of the voltage of the transformer T is reversed.

State 5 [t5 to t6]

On the primary side, the first capacitor C1 is discharged with a current passing through the primary winding np, and the second capacitor C2 and a capacitor Cs on the secondary side are charged. At a time t6, the value of a voltage indicated by the waveform "Vdsl" becomes zero, and the first diode D1 is brought into conduction. Subsequently, the first control circuit SC1 detects that the polarity of an AC voltage generated by the first driving winding nb1 has been reversed.

In the steady state, the operation of this switching power supply apparatus including the above-described circuit operations (1) to (5) is repeated every switching period.

The first control circuit SC1 is provided with an overcurrent protection circuit for forcing the first switching element Q1 to stop oscillation when a state lasts for a predetermined period in which a value of the voltage of the current detection resistor R11 is above a predetermined value and a value of the output voltage of a first rectifying and smoothing circuit RS1 is below a predetermined value. Accordingly, when the output current becomes excessive, the switching operation can be stopped. Consequently, the reliability of the switching power supply apparatus can be enhanced.

Furthermore, the first control circuit SC1 is provided with an overvoltage protection circuit for forcing the first switching element Q1 to stop oscillation when a value of the output voltage of the first rectifying and smoothing circuit RS1 is above a predetermined value. Accordingly, when the output voltage becomes excessive, the switching operation can be stopped. Consequently, the reliability of the switching power supply apparatus can be enhanced.

Still furthermore, the first control circuit SC1 is provided with a low voltage input protection circuit for forcing the first switching element Q1 to stop oscillation when the low voltage input protection circuit connected to the power input portion via a resistor (not shown) detects that a value of an input voltage is below a predetermined value. Accordingly, the first control circuit SC1 can prevent currents passing through the primary winding np of the transformer T, the first switching element Q1, and the second switching element Q2 from becoming excessive at a low voltage of the power input portion. Consequently, the reliability of the switching power supply apparatus can be enhanced.

Still furthermore, the first control circuit SC1 is provided with a frequency control portion for controlling the upper limit of a frequency used to control ON and OFF of the first switching element Q1. Accordingly, under light-load conditions, the increase in switching frequency, the increase in switching loss, the increase in heating value of a switching element can be prevented. Consequently, the reduction of circuit efficiency can be prevented.

Still furthermore, the first control circuit SC1 is provided with a frequency reducing portion for reducing a value of a frequency used to control ON and OFF of the first switching element Q1 when the frequency reducing portion detects, using a feedback signal transmitted from the output voltage detection circuit, that a load connected to the first rectifying and smoothing circuit RS1 is a light load.

Thus, by reducing a value of a switching frequency under light-load conditions, a switching loss can be reduced and the heat generation of a switching element can be prevented. This leads to the enhancement of circuit efficiency.

The turn-off circuit TC is mainly composed of a CR circuit including a capacitor and a resistor. A time at which the second switching element Q2 is turned off is determined using a CR time constant that is determined on the basis of the values of the capacitor and the resistor.

Accordingly, the turn-off circuit TC can be achieved with a small number of components. By setting a value of a CR time constant so that the second switching element Q2 is turned off when a voltage across the capacitor or the resistor reaches a threshold voltage, the second switching element Q2 can be turned off at any given time.

According to a switching power supply apparatus according to the first preferred embodiment of the present invention, the following advantages can be obtained.

A switching power supply apparatus according to the first preferred embodiment detects a time at which the polarity of an AC voltage generated by the first driving winding nb1 has been changed, and turns on the first switching element Q1 at a time based on the detection result. Accordingly, a time at which the first switching element Q1 is turned on can be set arbitrarily, and zero voltage switching of the first switching element Q1 can therefore be performed. This leads to the reduction of a switching loss.

A switching power supply apparatus according to the first preferred embodiment can maintain a control voltage for the first switching element Q1 constant regardless of changes in amplitude of an AC voltage generated by the first driving winding nb1. Accordingly, the minimum gate voltage required to turn on the first switching element Q1 can always be applied to the first switching element Q1, and a switching loss can therefore be reduced.

A switching power supply apparatus according to the first preferred embodiment detects a current passing through the first switching element Q1, and turns off the first switching element Q1 on the basis of the detection result. Accordingly, a current passing through the first switching element Q1 can be prevented from becoming excessive.

A switching power supply apparatus according to the first preferred embodiment (directly) drives and controls the second switching element Q2 using an AC voltage generated by the second driving winding nb2. Accordingly, a high-voltage IC and a pulse transformer are not required. On the other hand, a low-voltage IC can be used as a circuit for driving and controlling the first switching element Q1. Consequently, miniaturization of the switching power supply apparatus and cost reduction can be achieved.

A switching power supply apparatus according to the first preferred embodiment is provided with the turn-off circuit, and turns off the second switching element Q2 using the turn-off circuit. Accordingly, the ON period of the second switching element Q2 can be determined arbitrarily, and a high-efficiency operation can always be achieved even if a load or an input voltage changes.

A switching power supply apparatus according to the first preferred embodiment compares a signal based on a current passing through the first switching element Q1 with a signal based on the output voltage Vo, and determines a time at which the first switching element Q1 is turned off on the basis of the comparison result, thereby controlling the output voltage Vo. Accordingly, the value of the output voltage Vo can be set to a desirable value by controlling the ON period of the first switching element Q1. Furthermore, a switching power supply apparatus according to the first preferred embodiment is superior to a switching power supply apparatus for controlling the ON period of the first switching element Q1 using only a signal based on an output voltage in point of the output voltage stability and the output voltage response characteristic to a load change.

In a switching power supply apparatus according to the first preferred embodiment, the first control circuit SC1 for driving the first switching element Q1 operates using a DC voltage. Accordingly, a signal processing circuit can be used for each of an overcurrent protection circuit, an overvoltage protection circuit, a startup circuit, an operation stop circuit, a frequency control circuit, and a frequency reducing circuit which are required for a switching power supply apparatus. This achieves a high-functionality switching power supply apparatus.

In a switching power supply apparatus according to the first preferred embodiment, the first control circuit SC1 for driving the first switching element Q1 operates using a DC voltage. Accordingly, attached circuits used to achieve a high-functionality switching power supply apparatus and components included in the first control circuit SC1 can be integrated into an IC.

The first driving winding nb1 illustrated in FIG. 3 is used to obtain a power supply voltage for the first control circuit SC1. Accordingly, either of winding directions of the first driving winding nb1 can be used. In the following preferred embodiments, either of winding directions of the first driving winding nb1 can be similarly used.

Second Preferred Embodiment

Figure 5:
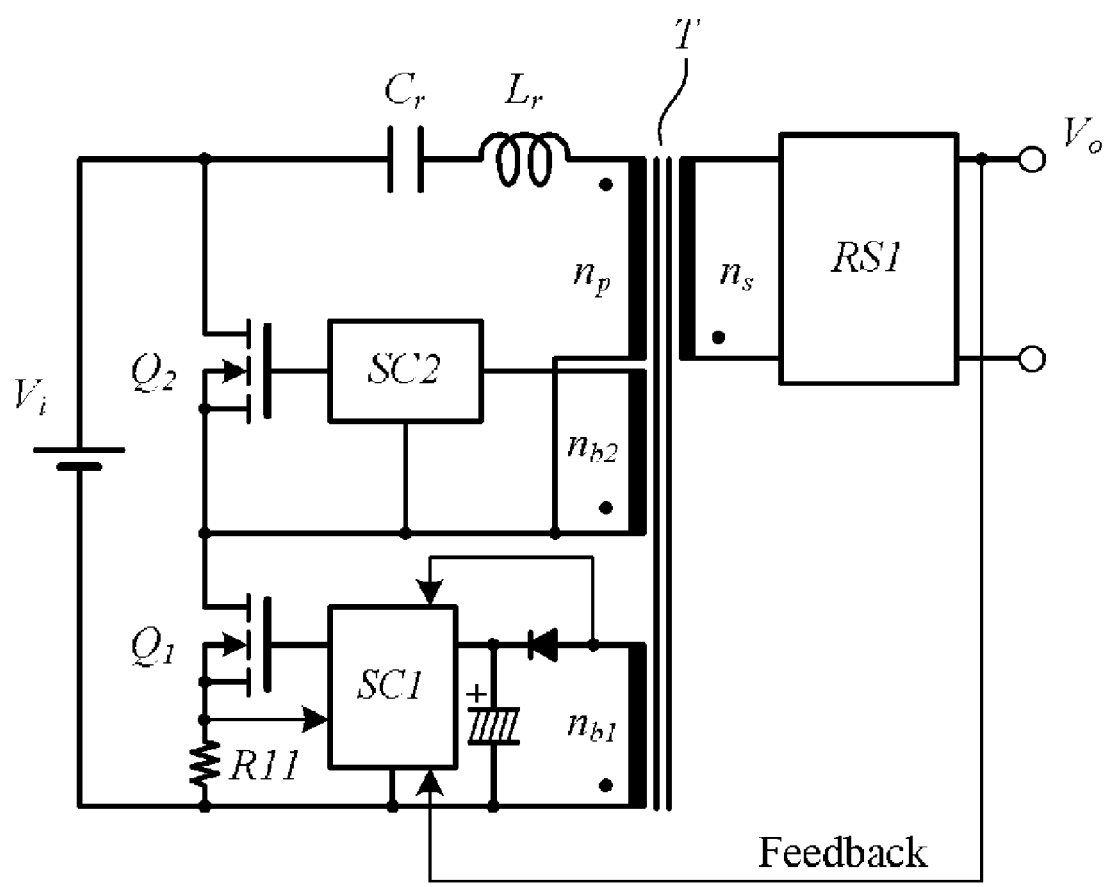
FIG. 5 is a circuit diagram of a switching power supply apparatus according to a second preferred embodiment of the present invention.
Figure 6A:
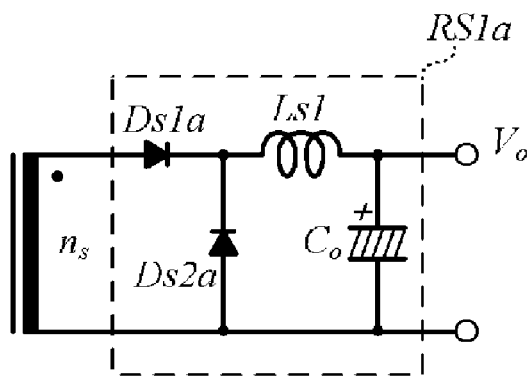
FIGS. 6A to 6C are partial circuit diagrams of a switching power supply apparatus according to the preferred second embodiment of the present invention.
Figure 6B:
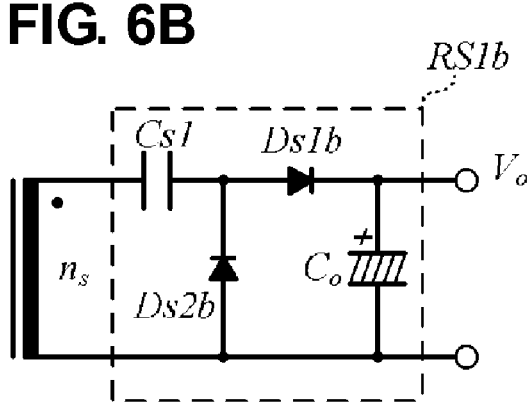
Figure 6C:
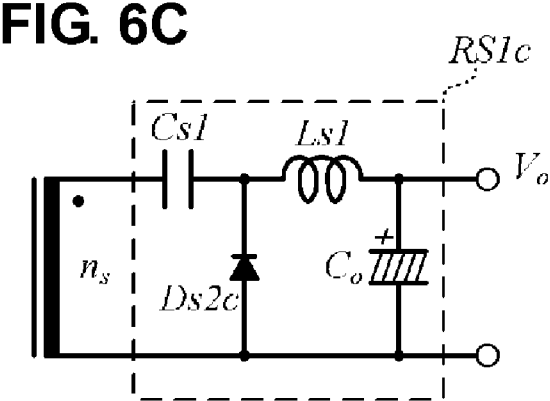
Figure 7A:
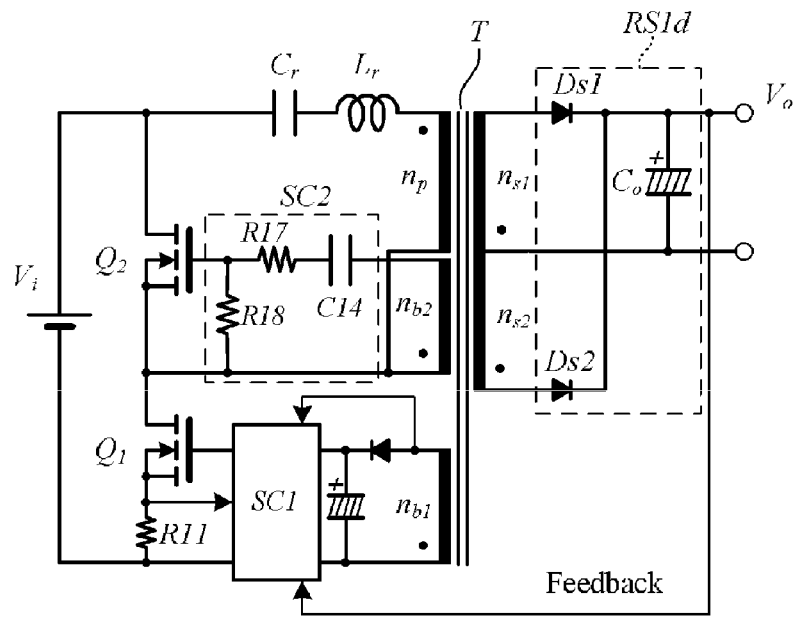
FIGS. 7A to 7C are circuit diagrams of other switching power supply apparatuses according to the second preferred embodiment of the present invention.
Figure 7B:
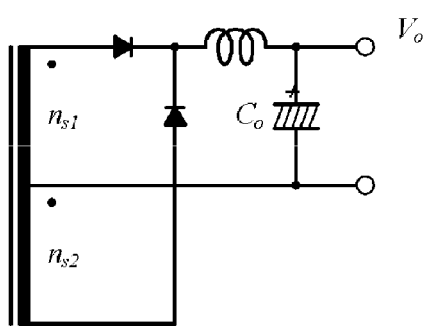
Figure 7C:
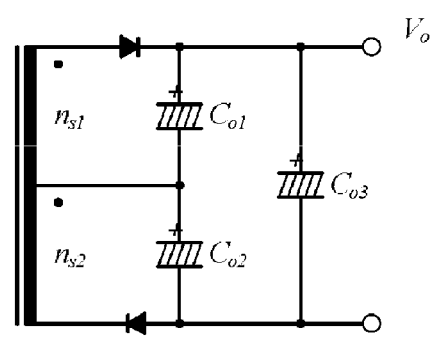

FIG. 5 is a circuit diagram of a switching power supply apparatus according to a second preferred embodiment of the present invention. Referring to FIG. 5, the general configuration of a first rectifying and smoothing circuit on the secondary side is illustrated. FIGS. 6A to 6C illustrate some exemplary configurations of the first rectifying and smoothing circuit on the secondary side. FIGS. 7A to 7C illustrate some other exemplary configurations of the first rectifying and smoothing circuit on the secondary side. It should be noted that, in each of FIGS. 5 and 7A, field effect transistors (FETs) Q1 and Q2 are preferably used as the first switching circuit S1 and the second switching circuit S2, respectively.

Referring to FIG. 6A, a diode Ds1a, a diode Ds2a, an inductor Ls1, and a capacitor Co define a forward-type rectifier circuit.

Referring to FIG. 6B, a diode Ds1b, a diode Ds2b, a capacitor Cs1, and the capacitor Co define a two-stage Cockcroft-Walton circuit (half-wave voltage doubler rectifier circuit).

Referring to FIG. 6C, a diode Ds2c, the inductor Ls1, the capacitor Cs1, and the capacitor Co define a boost rectifier circuit.

Referring to FIG. 7A, the transformer T includes two secondary windings, a secondary winding ns1 and a secondary winding ns2. The secondary winding ns1 and the secondary winding ns2 are connected to a diode Ds1 and a diode Ds2, respectively. The secondary winding ns1, the secondary winding ns2, the diode Ds1, the diode Ds2, and the capacitor Co define a center-tapped full-wave rectifier circuit. The second control circuit SC2 includes resistors and a capacitor. At a time set on the basis of a CR time constant, a gate-to-source voltage of the field effect transistor (FET) Q2, which is the second switching circuit S2, is equal to or less than a threshold voltage. Subsequently, the FET Q2 is turned off. Other configurations are the same as those described with reference to FIG. 3.

FIG. 7B illustrates another exemplary configuration of a first rectifying and smoothing circuit RSld on the secondary side of the transformer T. The transformer T includes two secondary windings, the secondary winding ns1 and the secondary winding ns2. The secondary winding ns1 and the secondary winding ns2 are connected to the diode Ds1 and the diode Ds2, respectively. The secondary winding ns1, the secondary winding ns2, the diode Ds1, the diode Ds2, the inductor Ls1, and the capacitor Co define a forward-type rectifier circuit.

FIG. 7C illustrates still another exemplary configuration of the first rectifying and smoothing circuit RSld on the secondary side of the transformer T. The transformer T includes two secondary windings, the secondary winding ns1 and the secondary winding ns2. The secondary winding ns1 is connected to the diode Ds1 and a capacitor Co1. The secondary winding ns2 is connected to the diode Ds2 and a capacitor Co2. The capacitor Co1 and the capacitor Co2 are connected in series. The secondary winding ns1, the secondary winding ns2, the diode Ds1, the diode Ds2, the capacitor Co1, the capacitor Co2, and a capacitor Co3 define a full-wave voltage doubler rectifier circuit. Thus, various configurations of a rectifying and smoothing circuit on the secondary side of the transformer T can be used.

The second control circuit SC2 includes a CR time constant circuit including only resistors and a capacitor (a resistor R17, a resistor R18, and a capacitor 14). When a gate voltage of the FET Q2 exceeds a threshold voltage in accordance with a voltage generated by the second driving winding nb2, the FET Q2 is turned on. After the FET Q2 has been turned on, the gate voltage of the FET Q2 decreases in accordance with a time constant of the CR time constant circuit. When the gate voltage of the FET Q2 is below a turn-off voltage, the FET Q2 is turned off. Consequently, the same effect as that obtained in the first preferred embodiment can be obtained.

Thus, by setting a CR time constant for the second control circuit SC2, a time at which the FET Q2 is turned off can be set. Accordingly, the second control circuit SC2 can have a simple configuration with a small number of components.

Third Preferred Embodiment

Figure 8:
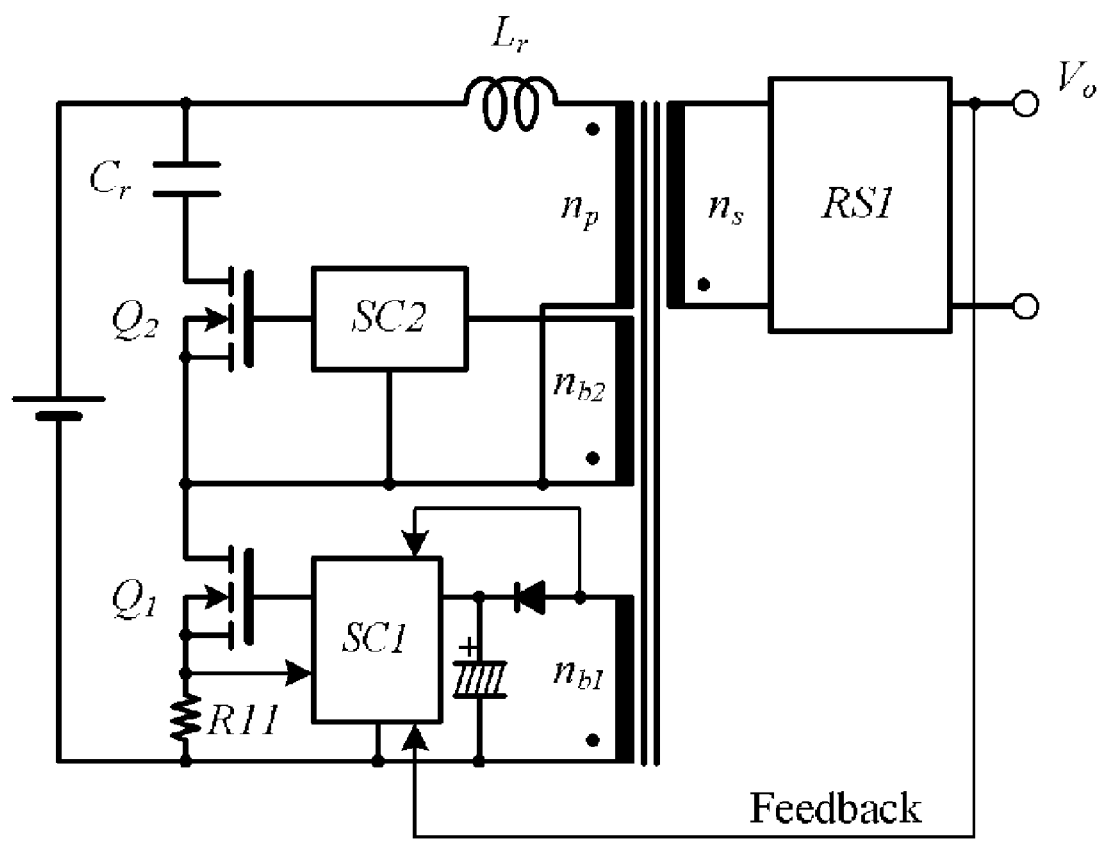
FIG. 8 is a circuit diagram of a switching power supply apparatus according to a third preferred embodiment of the present invention.

FIG. 8 is a circuit diagram of a switching power supply apparatus according to a third preferred embodiment of the present invention. The difference between a switching power supply apparatus according to the third preferred embodiment and the switching power supply apparatus illustrated in FIG. 3 is the connection location of the capacitor Cr or the location of the power input portion. That is, a switching power supply apparatus illustrated in FIG. 8 includes a series circuit including the power input portion, the inductor Lr, the primary winding np of the transformer T, and a first switching circuit with the first switching element Q1. A series circuit including the inductor Lr and the primary winding np of the transformer T is connected in parallel to a series circuit including at least one capacitor Cr and a second switching circuit with the second switching element Q2. Other configurations are the same as those described with reference to FIG. 3. It should be noted that the first diode D1 and the first capacitor C1 which are included in the first switching circuit S1 in FIG. 3, and the second diode D2 and the second capacitor C2 which are included in the second switching circuit S2 in FIG. 3 are not illustrated in FIG. 8.

Fourth Preferred Embodiment

Figure 9:
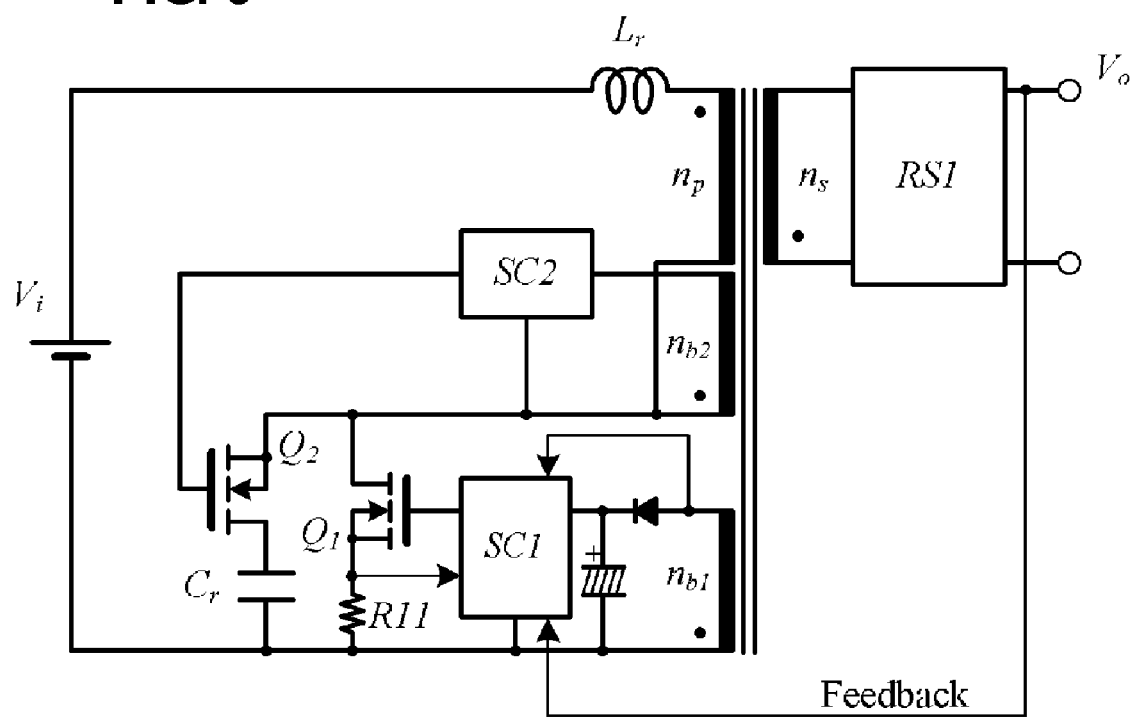
FIG. 9 is a circuit diagram of a switching power supply apparatus according to a fourth preferred embodiment of the present invention.

FIG. 9 is a circuit diagram of a switching power supply apparatus according to a fourth preferred embodiment of the present invention. The differences between a switching power supply apparatus according to the fourth preferred embodiment and the switching power supply apparatus illustrated in FIG. 3 are the connection locations of the capacitor Cr and the second switching element. That is, a switching power supply apparatus illustrated in FIG. 9 includes a series circuit including the power input portion, the inductor Lr, the primary winding np of the transformer T, and the first switching circuit with the first switching element Q1. A series circuit including at least one capacitor Cr and the second switching circuit with the second switching element Q2 is connected in parallel to the first switching circuit. Other configurations are the same as those described with reference to FIG. 3. It should be noted that the first diode D1 and the first capacitor C1 which are included in the first switching circuit S1 in FIG. 3, and the second diode D2 and the second capacitor C2 which are included in the second switching circuit S2 in FIG. 3 are not illustrated in FIG. 8. Even if a switching power supply apparatus has such a configuration illustrated in FIG. 9, the same effect as that obtained in the first preferred embodiment can be obtained.

Fifth Preferred Embodiment

Figure 10A:
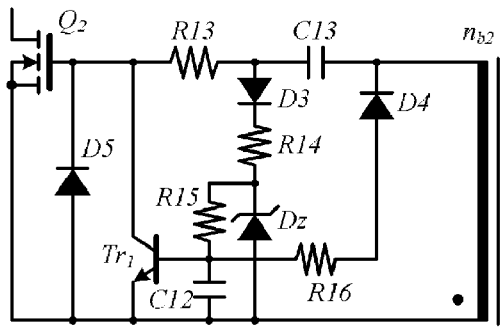
FIGS. 10A to 10C are partial circuit diagrams of switching power supply apparatuses according to a fifth preferred embodiment of the present invention.
Figure 10B:
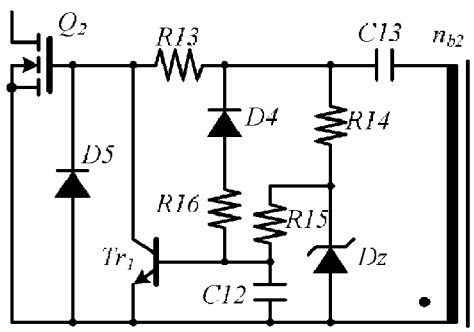
Figure 10C:
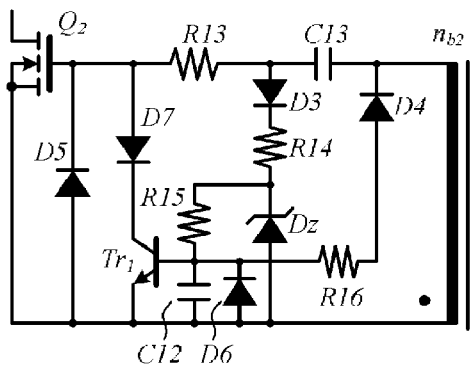

FIGS. 10A to 10C are diagrams illustrating some examples of a second control circuit that operates using an AC voltage generated by the second driving winding nb2. Referring to an example illustrated in FIG. 10A, a series circuit including the capacitor C13 and the resistor R13 is connected between on end of the second driving winding nb2 and the gate of the second switching element Q2. A diode D3, a resistor R14, a resistor R15, the capacitor C12, and a Zener diode Dz form a turn-off circuit. The Zener diode Dz maintains a voltage to be applied to a series circuit including the resistor R15 and the capacitor C12 at the Zener diode when the voltage of the second driving winding nb2 is equal to or larger than a predetermined voltage, and a voltage larger than the Zener voltage is applied to the Zener diode Dz. Consequently, for example, even if the voltage of the power input portion changes and a startup voltage for the second driving winding nb2 therefore changes, a timer operation performed by the turn-off circuit can be ensured. That is, a period from a time at which the second switching element Q2 is turned on to a time at which the second switching element Q2 is turned off can be maintained constant.

A circuit including a resistor R16 and a diode D4 functions as a discharging circuit for rapidly discharging (resetting) the charge stored in the capacitor C12 when the first switching element Q1 is in the ON state. A diode D5 prevents the application of a negative voltage to the gate of the second switching element Q2, thereby preventing the occurrence of an error operation.

Referring to an example illustrated in FIG. 10B, a series circuit including the capacitor C13 and the resistor R13 is connected between on end of the second driving winding nb2 and the gate of the second switching element Q2. The resistor R14, the resistor R15, the capacitor C12, and the Zener diode Dz define a turn-off circuit. The configuration of the Zener diode Dz has been described with reference to FIG. 10A, and the description thereof will be therefore omitted. A circuit including the resistor R16 and the diode D4 functions as a discharging circuit for rapidly discharging (resetting) the charge stored in the capacitor C12 when the first switching element Q1 is in the ON state. The diode D5 prevents the application of a negative voltage to the gate of the second switching element Q2, thereby preventing the occurrence of an error operation.

Referring to an example illustrated in FIG. 10C, a diode D6 is connected between the both ends of the capacitor C12. The connection direction of the diode D6 is the same as that of the diode D4. This can prevent the ON period of the second switching element Q2 from being changed in accordance with a change in input voltage or load.

A diode D7 is connected to a collector of the transistor Tr1. This can prevent the occurrence of an inverse current flowing from the emitter of the transistor Tr1 to the collector thereof. Furthermore, this can prevent the ON period of the second switching element Q2 from being changed in accordance with a change in the current amplification factor of the transistor Tr1. Other configurations are the same as those described with reference to FIG. 10A.

Sixth Preferred Embodiment

Figure 11:
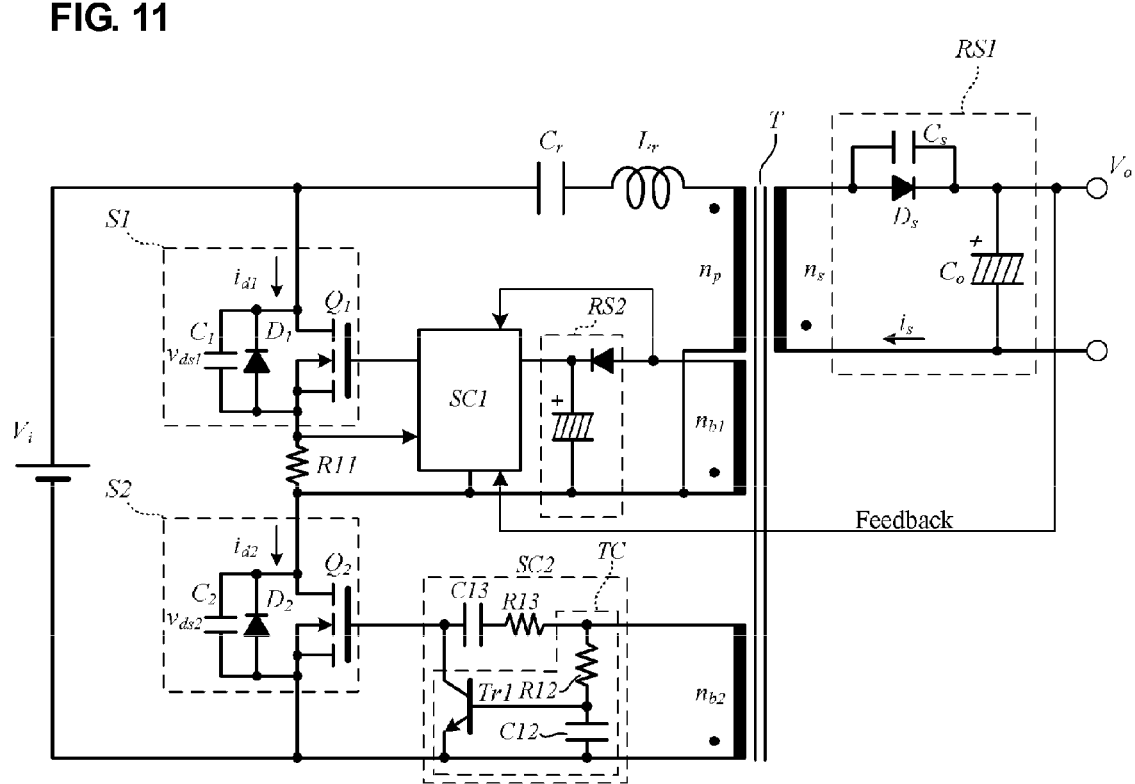
FIG. 11 is a circuit diagram of a switching power supply apparatus according to a sixth preferred embodiment of the present invention.

FIG. 11 is a circuit diagram of a switching power supply apparatus according to a sixth preferred embodiment of the present invention. The difference between a circuit illustrated in FIG. 11 and the circuit illustrated in FIG. 3 is that a connection relationship between the first switching circuit S1 controlled by the first control circuit SC1 and the second switching circuit S2 controlled by the second control circuit SC2 is reversed.

Referring to an example illustrated in FIG. 11, the first switching circuit S1 is connected in parallel to a series circuit including the inductor Lr, the primary winding np of the transformer T, and at least one capacitor Cr. The switching power supply apparatus illustrated in FIG. 11 includes a series circuit including the power input portion, the inductor Lr, the primary winding np of the transformer T, the capacitor Cr, and the second switching circuit S2. Other configurations are the same as those described with reference to FIG. 3.

In this example, unlike the circuit illustrated in FIG. 3, the second switching circuit S2 functions as a main switching circuit, and the first switching circuit S1 functions as a clamping circuit.

In order to cause the first control circuit SC1 to operate at the startup of the switching power supply apparatus, a startup circuit for charging a smoothing capacitor for the second rectifying and smoothing circuit RS2 is disposed. However, in FIG. 11, this startup circuit is not illustrated.

Seventh Preferred Embodiment

Figure 12:
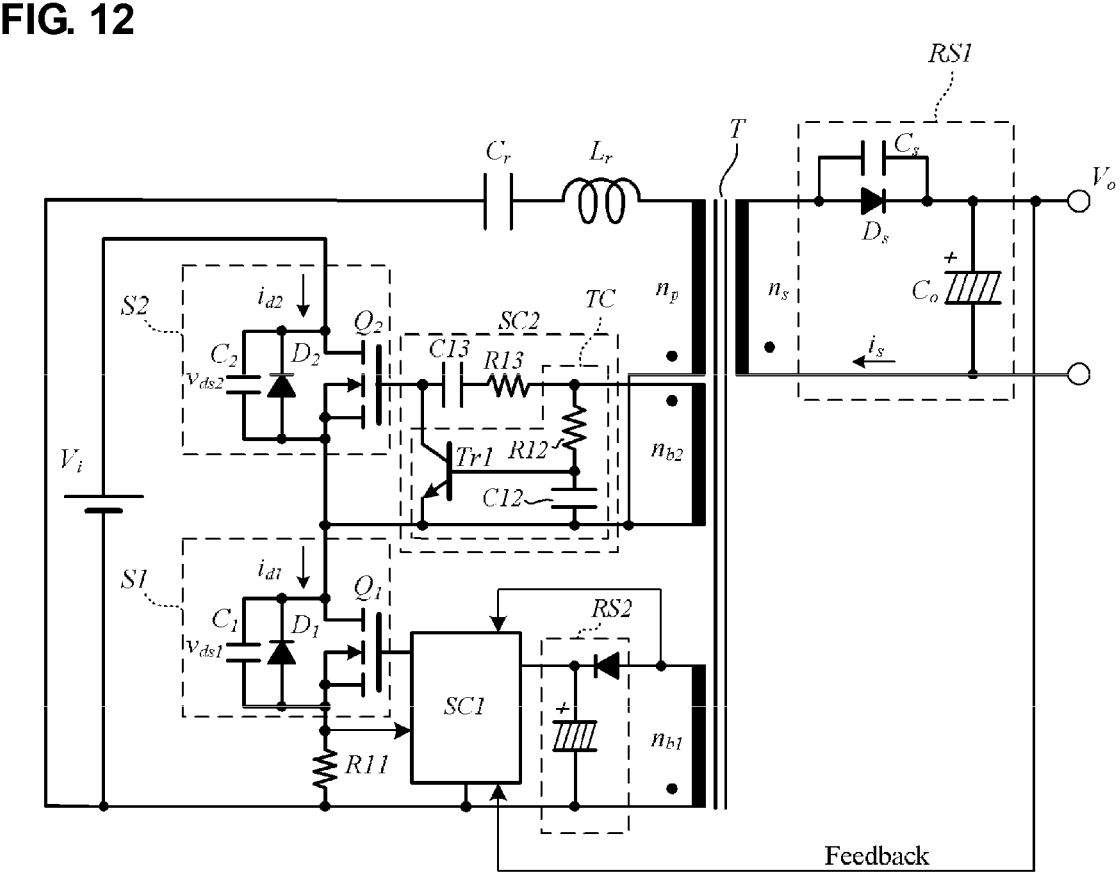
FIG. 12 is a circuit diagram of a switching power supply apparatus according to a seventh preferred embodiment of the present invention.

FIG. 12 is a circuit diagram of a switching power supply apparatus according to a seventh preferred embodiment of the present invention. In the example illustrated in FIG. 3, the series circuit including the capacitor Cr, the inductor Lr, and the primary winding np is connected in series to the first switching circuit S1 and is connected in parallel to the second switching circuit S2. However, in an example illustrated in FIG. 12, a series circuit including the capacitor Cr, the inductor Lr, and the primary winding np is connected in parallel to the first switching circuit S1 and is connected in series to the second switching circuit S2. Other configurations are the same as those described with reference to FIG. 3.

In this example, unlike the circuit illustrated in FIG. 3, the second switching circuit S2 functions as a main switching circuit, and the first switching circuit S1 functions as a clamping circuit.

While preferred embodiments of the invention have been described above, it is to be understood that variations and modifications will be apparent to those skilled in the art without departing the scope and spirit of the invention. The scope of the invention, therefore, is to be determined solely by the following claims.

What is claimed is:

1. A switching power supply apparatus comprising:
   a first switching circuit including a parallel connection circuit that includes a first switching element, a first diode, and a first capacitor;
   a second switching circuit including a parallel connection circuit that includes a second switching element, a second diode, and a second capacitor;
   a first control circuit configured to operate using a direct current and control ON and OFF of the first switching element;
   a second control circuit configured to control ON and OFF of the second switching element, the second control circuit including a turn-off circuit; and
   a transformer including a primary winding, a secondary winding, a first driving winding, and a second driving winding, the secondary winding being connected to a first rectifying and smoothing circuit, the first and second driving windings each generating a voltage substantially proportional to a voltage of the primary winding, the first driving winding being connected to the first control circuit via a second rectifying and smoothing circuit, the second driving winding being connected to the second control circuit; wherein
   a power input portion, an inductor, the primary winding of the transformer, at least one capacitor, and the first switching circuit define a series circuit, and a series circuit including the inductor, the primary winding of the transformer, and the at least one capacitor is connected in parallel to the second switching circuit; or
   the power input portion, the inductor, the primary winding of the transformer, and the first switching circuit define a series circuit, and a series circuit including the inductor and the primary winding of the transformer is connected in parallel to a series circuit including the second switching circuit and at least one capacitor; or
   the power input portion, the inductor, the primary winding of the transformer, and the first switching circuit define a series circuit, and a series circuit including the second switching circuit and at least one capacitor is connected in parallel to the first switching circuit; and
   an output voltage is controlled by controlling an ON period of the first switching element, and the second switching element is forcefully turned off after a predetermined time set by the turn-off circuit has elapsed since the second control circuit, operated using an alternating voltage generated by the second driving winding, turned the second switching element on.

2. The switching power supply apparatus according to claim 1, wherein the first control circuit includes a semiconductor integrated circuit including a logic circuit arranged to control a time at which the first switching element is turned on and a time at which the first switching element is turned off using a direct voltage.

3. The switching power supply apparatus according to claim 1, wherein the first control circuit includes a polarity reversal detection circuit arranged to detect whether a polarity of a voltage generated by the first driving winding has been reversed, and a time at which the first switching element is turned on is determined on the basis of an output of the polarity reversal detection circuit.

4. The switching power supply apparatus according to claim 1, wherein the first control circuit includes a current detection circuit arranged to detect a current passing through the first switching element as a voltage using a current detection resistor connected in series to the first switching element, and an output voltage detection circuit arranged to detect an output voltage output on a secondary side of the transformer, and the first control circuit controls a time at which the first switching element is turned off on the basis of outputs of the current detection circuit and the output voltage detection circuit.

5. The switching power supply apparatus according to claim 4, wherein the first control circuit includes an overcurrent protection portion configured to perform control processing so as to turn off the first switching element so as to cause the first switching element to continue an oscillation operation when a value of an output obtained from the current detection circuit reaches a predetermined value, and force the first switching element to stop an oscillation operation when a state in which a value of an output obtained from the output voltage detection circuit is below a predetermined value lasts for a predetermined time.

6. The switching power supply apparatus according to claim 4, wherein the first control circuit includes an overvoltage protection portion configured to force the first switching element to stop an oscillation operation when a value of an output obtained from the output voltage detection circuit exceeds a predetermined value.

7. The switching power supply apparatus according to claim 4, further comprising an input voltage detection circuit configured to detect a voltage of the power input portion, and the first control circuit includes a low voltage input protection portion configured to force the first switching element to stop an oscillation operation when a detection value obtained by the input voltage detection circuit is below a predetermined value.

8. The switching power supply apparatus according to claim 4, wherein the first control circuit includes a frequency control portion configured to control an upper limit of a frequency used to control ON and OFF of the first switching element.

9. The switching power supply apparatus according to claim 4, wherein the first control circuit includes a frequency reducing portion configured to reduce a value of a frequency used to control ON and OFF of the first switching element when the frequency reducing portion detects, using a feedback signal transmitted from the output voltage detection circuit, that a load connected to the first rectifying and smoothing circuit is under lighter-load conditions as compared with predetermined load conditions.

10. The switching power supply apparatus according to claim 1, wherein an inductance of the inductor corresponds to a leakage inductance of the transformer.

11. The switching power supply apparatus according to claim 1, wherein at least one of the first switching circuit and the second switching circuit includes a field effect transistor.

12. The switching power supply apparatus according to claim 1, wherein the turn-off circuit includes a CR circuit including a capacitor and a resistor, and wherein a time at which the second switching element is turned off is set on the basis of a CR time constant that is determined on the basis of a product of a value of the capacitor and a value of the resistor.

13. A switching power supply apparatus comprising:
a first switching circuit including a parallel connection circuit that includes a first switching element, a first diode, and a first capacitor;
a second switching circuit including a parallel connection circuit that includes a second switching element, a second diode, and a second capacitor;
a first control circuit configured to operate using a direct current and control ON and OFF of the first switching element;
a second control circuit configured to control ON and OFF of the second switching element, the second control circuit including a turn-off circuit; and
a transformer including a primary winding, a secondary winding, a first driving winding, and a second driving winding, the secondary winding being connected to a first rectifying and smoothing circuit, the first and second driving windings each generating a voltage substantially proportional to a voltage of the primary winding, the first driving winding being connected to the first control circuit via a second rectifying and smoothing circuit, one end of the second driving winding being connected to one end of the second switching circuit, the other end of the second driving winding being connected to the second control circuit; wherein
a power input portion, an inductor, the primary winding of the transformer, at least one capacitor, and the second switching circuit define a series circuit, and a series circuit including the inductor, the primary winding of the transformer, and the at least one capacitor is connected in parallel to the first switching circuit; or
the power input portion, the inductor, the primary winding of the transformer, and the second switching circuit define a series circuit, and a series circuit including the inductor and the primary winding of the transformer is connected in parallel to a series circuit including the first switching circuit and at least one capacitor; or
the power input portion, the inductor, the primary winding of the transformer, and the second switching circuit define a series circuit, and a series circuit including the first switching circuit and at least one capacitor is connected in parallel to the second switching circuit; and
an output voltage is controlled by controlling an ON period of the second switching element, and the second switching element is forcefully turned off after a predetermined time set by the turn-off circuit has elapsed since the second control circuit, operated using an alternating voltage generated by the second driving winding, turned the second switching element on.

14. The switching power supply apparatus according to claim 13, wherein the first control circuit includes a semiconductor integrated circuit including a logic circuit arranged to control a time at which the first switching element is turned on and a time at which the first switching element is turned off using a direct voltage.

15. The switching power supply apparatus according to claim 13, wherein the first control circuit includes a polarity reversal detection circuit arranged to detect whether a polarity of a voltage generated by the first driving winding has been reversed, and a time at which the first switching element is turned on is determined on the basis of an output of the polarity reversal detection circuit.

16. The switching power supply apparatus according to claim 13, wherein the first control circuit includes a current detection circuit arranged to detect a current passing through the first switching element as a voltage using a current detection resistor connected in series to the first switching element, and an output voltage detection circuit arranged to detect an output voltage output on a secondary side of the transformer, and the first control circuit controls a time at which the first switching element is turned off on the basis of outputs of the current detection circuit and the output voltage detection circuit.

17. The switching power supply apparatus according to claim 16, wherein the first control circuit includes an overcurrent protection portion configured to perform control processing so as to turn off the first switching element so as to cause the first switching element to continue an oscillation operation when a value of an output obtained from the current detection circuit reaches a predetermined value, and force the first switching element to stop an oscillation operation when a state in which a value of an output obtained from the output voltage detection circuit is below a predetermined value lasts for a predetermined time.

18. The switching power supply apparatus according to claim 16, wherein the first control circuit includes an overvoltage protection portion configured to force the first switching element to stop an oscillation operation when a value of an output obtained from the output voltage detection circuit exceeds a predetermined value.

19. The switching power supply apparatus according to claim 16, further comprising an input voltage detection circuit configured to detect a voltage of the power input portion, and the first control circuit includes a low voltage input protection portion configured to force the first switching element to stop an oscillation operation when a detection value obtained by the input voltage detection circuit is below a predetermined value.

20. The switching power supply apparatus according to claim 16, wherein the first control circuit includes a frequency control portion configured to control an upper limit of a frequency used to control ON and OFF of the first switching element.

21. The switching power supply apparatus according to claim 16, wherein the first control circuit includes a frequency reducing portion configured to reduce a value of a frequency used to control ON and OFF of the first switching element when the frequency reducing portion detects, using a feedback signal transmitted from the output voltage detection circuit, that a load connected to the first rectifying and smoothing circuit is under lighter-load conditions as compared with predetermined load conditions.

22. The switching power supply apparatus according to claim 13, wherein an inductance of the inductor corresponds to a leakage inductance of the transformer.

23. The switching power supply apparatus according to claim 13, wherein at least one of the first switching circuit and the second switching circuit includes a field effect transistor.

24. The switching power supply apparatus according to claim 13, wherein the turn-off circuit includes a CR circuit including a capacitor and a resistor, and wherein a time at which the second switching element is turned off is set on the basis of a CR time constant that is determined on the basis of a product of a value of the capacitor and a value of the resistor.

* * * * *